US006732227B1

(12) United States Patent
Baumann (10) Patent No.: US 6,732,227 B1
(45) Date of Patent: May 4, 2004

(54) NETWORK TRANSLATION CIRCUIT AND METHOD USING A SEGMENTABLE CONTENT ADDRESSABLE MEMORY

(75) Inventor: Mark Baumann, Campbell, CA (US)

(73) Assignee: Integrated Device Technology, Inc., Santa Clara, CA (US)

(*) Notice: Subject to any disclaimer, the term of this patent is extended or adjusted under 35 U.S.C. 154(b) by 0 days.

(21) Appl. No.: 09/655,019

(22) Filed: Sep. 5, 2000

(51) Int. Cl.[7] .................... G06F 12/00; G06F 13/00; G11C 15/00; H04L 12/00
(52) U.S. Cl. .................... 711/108; 711/202; 365/49; 370/401
(58) Field of Search .................... 711/108, 5, 202; 365/49, 230.03; 370/401

(56) References Cited

U.S. PATENT DOCUMENTS

| | | | | |
|---|---|---|---|---|
| 5,706,224 A | * | 1/1998 | Srinivasan et al. | 365/49 |
| 6,000,008 A | * | 12/1999 | Simcoe | 711/108 |
| 6,243,281 B1 | | 6/2001 | Pereira | 365/49 |
| 6,253,280 B1 | * | 6/2001 | Voelkel | 711/108 |
| 6,324,087 B1 | * | 11/2001 | Pereira | 365/49 |
| 6,374,326 B1 | * | 4/2002 | Kansal et al. | 711/108 |

* cited by examiner

Primary Examiner—Glenn Gossage
(74) Attorney, Agent, or Firm—Bever, Hoffman & Harms, LLP (57) ABSTRACT

A translation circuit for translating addresses between computer networks and an associated method of performing address translation for a computer system are provided. The translation circuit includes a content addressable memory (CAM) device having a CAM array that is logically divided into a plurality of CAM segments. First and second sets of CAM segments are designated to perform comparison operations for addresses having first and second widths, respectively. An instruction provided to the CAM device specifies an address translation having either the first or second width. A comparison operation is performed in the first set of segments if the instruction specifies an address translation of the first width. A comparison operation is performed in the second set of segments if the instruction specifies an address translation of the second width. In one embodiment, each segment has the same size, and includes a plurality of sub-segments, each having the same width.

23 Claims, 11 Drawing Sheets

NETWORK TRANSLATION CIRCUIT AND METHOD USING A SEGMENTABLE CONTENT ADDRESSABLE MEMORY

BACKGROUND OF THE INVENTION

1. Field of the Invention

The present invention relates to a translation circuit for use in a computer network. More specifically, the present invention relates to a translation circuit using a segmentable content addressable memory (CAM).

2. Discussion of Related Art

Figure 1:
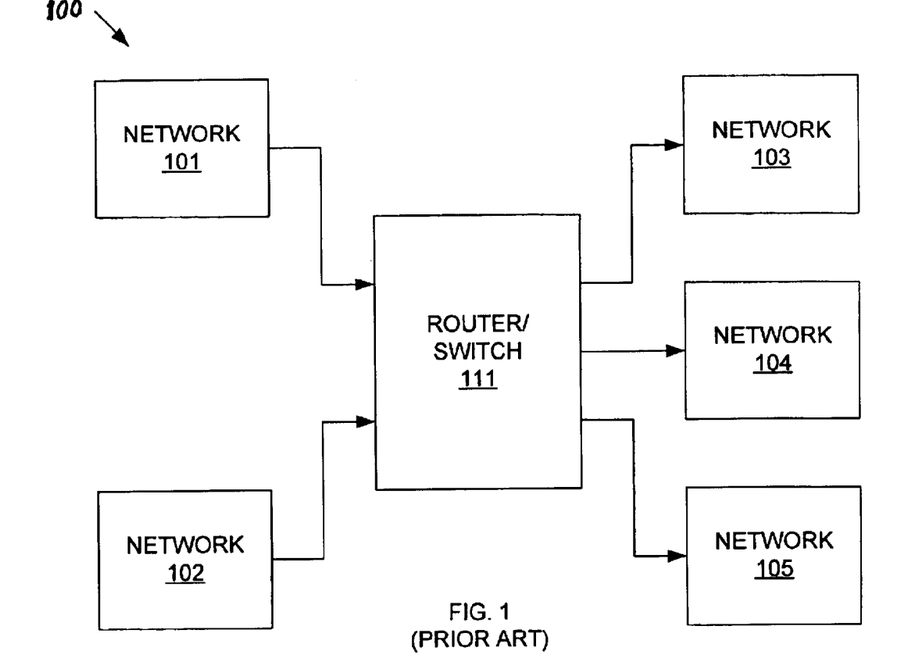
FIG. 1 is a block diagram of a conventional computer network system.

FIG. 1 is a block diagram of a conventional computer network system 100. System 100 includes computer networks 101–105 and router/switch 111. Networks 101 and 102 communicate with networks 103, 104 and 105 through router/switch 111. In system 100, networks 101–105 may use different address formats. Router/switch 111 must therefore be capable of receiving addresses from network 101 or network 102, translating these addresses, and routing the translated addresses to the appropriate one of networks 103–105. As the number of networks coupled to router/switch 111 increases, router/switch 111 must therefore be capable of performing address translations for a large number of varying networks.

Typically, these address translations are performed by software. For example, a Central Processing Unit (CPU) in router/switch 111 can perform an address translation using a binary search that uses either a Patricia Tree or a hashing method. This binary search proceeds through a tree structure until a unique match is found. A 32-bit lookup typically requires hundreds of CPU cycles to perform. This address translation speed is acceptable in relatively slow interfaces (e.g., interfaces of less than 10 megabyte/second (Mbyte/sec)). However, as the speed of network system 100 increases to 1 gigabyte/second (Gbyte/sec) or greater, a software address translation is not fast enough. A hardware assist must therefore be provided to speed up address translations.

One conventional hardware assist device is a content addressable memory (CAM). The CAM is a pipelined device that is capable of performing a new lookup or search every CAM clock cycle (e.g., every 10 nanoseconds (ns)). Thus, the CAM performs a rapid pattern recognition function that increases the throughput of network system 100. In the Ethernet protocol, which is the most common protocol, a new packet of information can arrive every 64 byte transfers. Router/switch 111 must therefore be able to read the address in the header of an incoming packet, and provide a revised header that identifies the translated address and an output port, all within 64 clock cycles, to maintain the line speed throughput of router/switch 111.

Figure 2A:
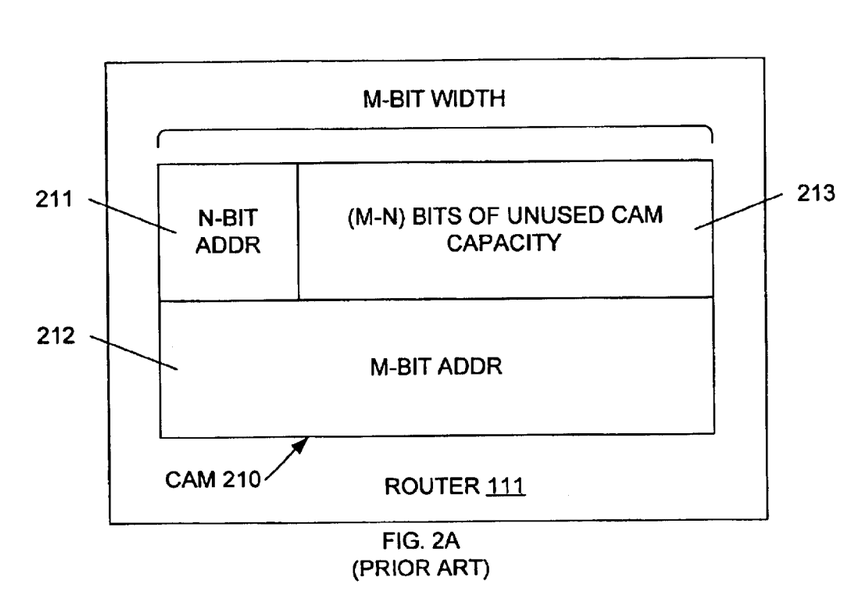
FIGS. 2A and 2B are block diagrams of conventional CAM structures used in the router/switch of FIG. 1.

A conventional CAM does not have the ability to efficiently handle variable width address translations in a single device. Some CAMs allow lookups having a width corresponding to the width of the CAM, and additionally provide a mask to enable narrower lookups to be performed. FIG. 2A is a block diagram of a CAM 210 that is used to perform address translations for both N-bit and M-bit addresses, where M is greater than N. CAM 210 is logically divided into a first section 211 that is used to translate addresses having a width of N-bits, a second section 212 that is used to translate addresses having a width of M-bits, and a third section 213, which is not used, having a width of (M-N)-bits. Third section 213 represents a significant amount of wasted capacity within CAM 210.

Figure 2B:
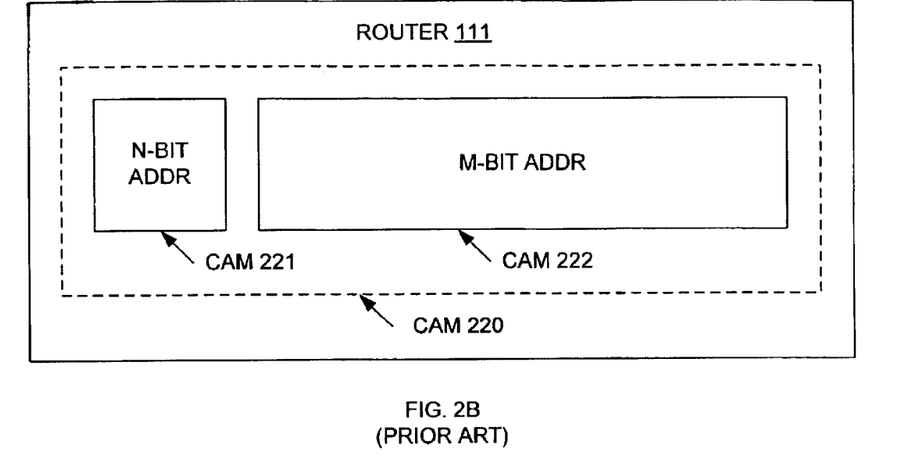

FIG. 2B is a block diagram of another CAM 220 that is used to perform address translations for both N-bit and M-bit addresses. CAM 220 includes a first CAM 221 that is used to translate addresses having a width of N-bits, and a second CAM 222 that is used to translate addresses having a width of M-bits. Because two separate CAMs 221–222 are required to form CAM 220, the resulting router 111 is relatively costly and consumes excessive board space and power.

It would therefore be desirable to have a translation circuit that uses a single CAM to provide the required address translations for multiple different network interfaces, without having significant wasted capacity within the CAM.

SUMMARY

Accordingly, the present invention provides a translation circuit that includes a CAM device having a segmentable CAM array. This CAM array that is logically divided into a plurality of CAM segments. In one embodiment, each of the CAM segments has a width of 288-bits. However, other widths can be used in other embodiments. The CAM segments are designated to perform address comparison operations of different widths. For example, first, second and third sets of CAM segments can be designated to perform address comparison operations having first, second and third widths, respectively. In one embodiment, the first, second and third widths are 72-bits, 144-bits and 288-bits, respectively.

Each of the CAM segments is sub-divided into a plurality of sub-segments, each having the same width. In the given example, each 288-bit CAM segment is sub-divided into four 72-bit wide sub-segments. Thus, to implement a 72-bit comparison operation in the first set of CAM segments, each of the CAM segments in the first set is programmed to store four columns of 72-bit address comparison values.

To implement a 144-bit comparison operation in the second set of CAM segments, each of the CAM segments in the second set is programmed to store two columns of 144-bit address comparison values. Each of these two 144-bit columns is formed by two 72-bit wide sub-segments.

To implement a 288-bit comparison operation in the third set of CAM segments, each of the CAM segments in the third set is programmed to store one column of 288-bit address comparison values. This 288-bit column is formed by four 72-bit wide sub-segments. Fitting address comparison values of different widths into a single CAM array advantageously minimizes wasted CAM capacity.

An instruction is provided to the CAM device to specify an address translation having the first width, the second width or the third width. A comparison operation is performed in the first, second or third set of CAM segments when the instruction specifies an address translation of the first width, the second width or the third width, respectively. Because comparison operations are only performed in the relevant segments, power savings are advantageously realized.

In one embodiment, the CAM device includes a configuration register that is programmed to store values defining the locations of first, second and third sets of CAM segments in the CAM array. This advantageously enables the resources of the translation circuit to be modified in view of the nature of the connected networks.

In another embodiment, the CAM device includes size logic coupled to the CAM array. The size logic processes results from the first, second and third sets of CAM segments in a manner consistent with the widths of the comparison operations performed by these segments. The size logic provides results to a priority encoder, which in turn, generates an index signal representative of the highest priority match detected during the comparison operation. The index signal is then used to address a static random access memory (SARAM), which stores the translated addresses.

Other functions performed by the CAM device can include global and local masking, a bypass function, and burst write capability.

The present invention will be more fully understood in view of the following description and drawings.

DETAILED DESCRIPTION

Figure 3:
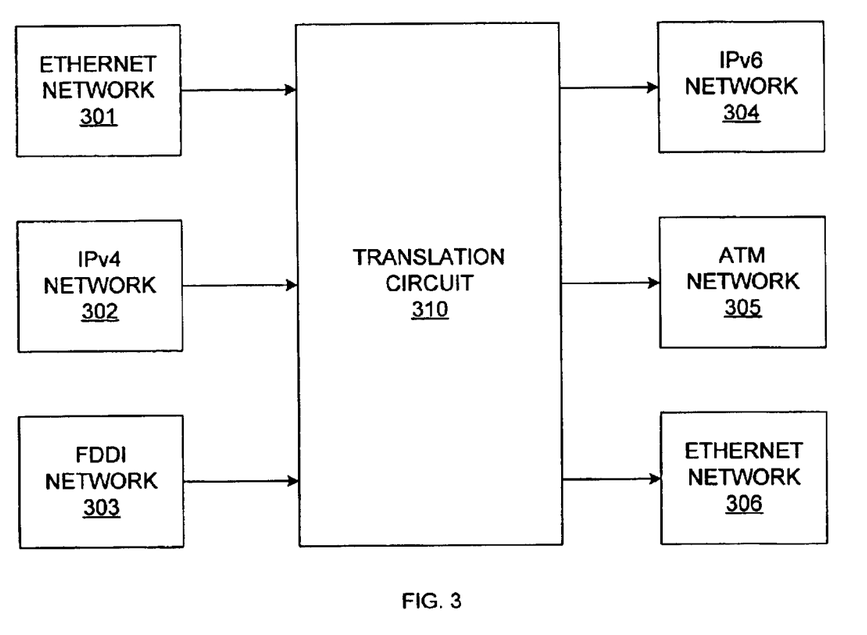
FIG. 3 is a block diagram illustrating a first set of networks and a second set of networks, which are coupled by a single translation circuit in accordance with one embodiment of the invention.

FIG. 3 is a block diagram illustrating a first set of networks 301–303 and a second set of networks 304–306, which are coupled by a single translation circuit 310 in accordance with one embodiment of the invention. Each of the networks 301–303 in the first set transmits information to translation circuit 310. Networks 301–303 are defined as 'ingress' networks, because information enters translation circuit 310 from these networks. Each of the networks 304–306 receives information from translation circuit 310. Networks 304–306 are defined as 'egress' networks because information leaves translation circuit 310 to go to these networks. As described in more detail below, translation circuit 310 includes a segmentable CAM array that is configured in view of the characteristics of networks 301–306. Although the described embodiment includes three ingress networks and three egress networks, it is understood that other numbers of networks can be used in other embodiments of the invention.

Each of networks 301–306 has an associated network 'type'. Examples of network types include, but are not limited to, Ethernet, Internet protocol (IP), asynchronous transfer mode (ATM) and fiber distributed data interface (FDDI). Each of these different network types has a different addressing scheme. As a result, communication between different network types requires address translation. This address translation is provided by translation circuit 310.

In the described example, networks 301 and 306 are Ethernet networks, each having a maximum address width of 32-bits. Network 302 is an Internet protocol, version 4 (IPv4) network having a maximum address width of 32-bits. Network 303 is an FDDI network having a maximum address width of 32-bits. Network 304 is an Internet protocol, version 6 (IPv6) network having a maximum address width of 128 bits. Network 305 is an ATM network having a maximum address width of up to 48-bits. Other network types can be used in other embodiments of the present invention.

TRANSLATION CIRCUIT

Figure 4:
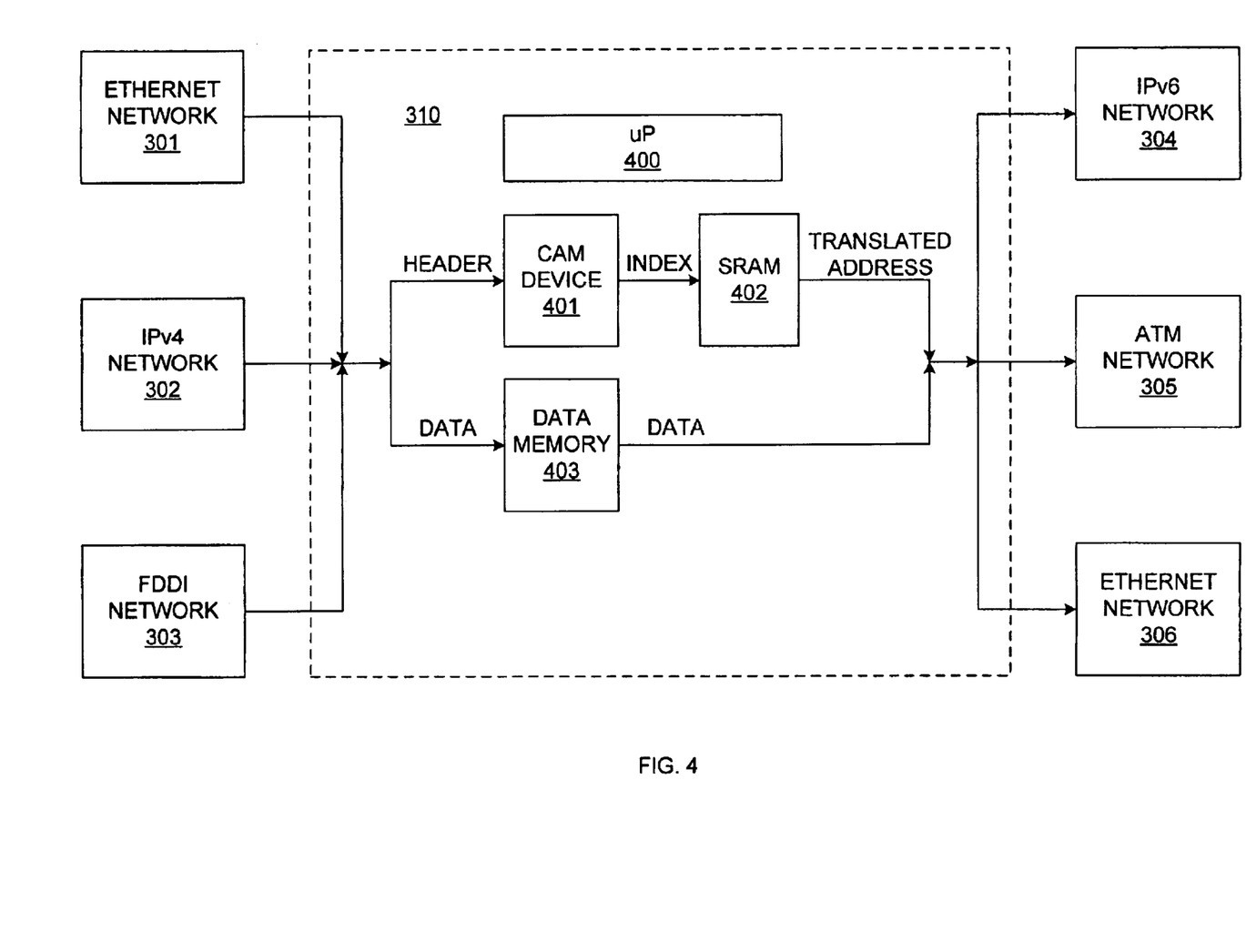
FIG. 4 is a block diagram illustrating in more detail the translation circuit of FIG. 3 in accordance with one embodiment of the present invention.

FIG. 4 is a block diagram that shows translation circuit 310 in more detail. Translation circuit 310 includes microprocessor (up) 400, content addressable memory (CAM) device 401, SRAM array 402 and data memory 403. In general, ingress networks 301–303 communicate with egress networks 304–306 as follows. An ingress network transmits information including a header and corresponding data to translation circuit 310. The header is routed to CAM device 401 and the corresponding data is routed to data memory 403 under the control of microprocessor 400. The corresponding data is stored in data memory 403 until CAM device 401 and SRAM array 402 generate a translated address.

The header includes both an instruction and address information. The instruction identifies the current operation as a lookup (i.e., compare) operation. (As described in more detail below, the instruction can also define other types of operations.) The instruction also identifies the size of the lookup operation to be performed. In the described embodiment, the instruction will identify the lookup operation as a 72-bit lookup, a 144-bit lookup or a 288-bit lookup. The size of the lookup corresponds with the particular ingress network transmitting the header. Thus, Ethernet network 301 may require a 72-bit lookup operation, IPv4 network 302 may require a 144-bit lookup operation and FDDI network 303 may require a 288-bit lookup operation. Alternatively, more than one of the ingress networks 301–303 may require the same size lookup operation. For example, networks 301 and 302 may both require 72-bit lookup operations.

The address information included in the header has a width that corresponds with the size of the lookup operation to be performed. That is, if the instruction identifies a 72-bit lookup operation, then the address information included in the header is 72-bits wide. Note that the address information included in the header is longer than the maximum address sizes of ingress networks 301–303 because additional bytes are added to the address to help speed up the lookup procedure.

CAM device 401 includes a single CAM array that is configured to store 72-bit entries, 144-bit entries and 288-bit entries. As described in more detail below, the address information in the header is compared with entries of corresponding width in CAM device 401. For example, a 72-bit address is only compared with the 72-bit entries of CAM device 401. CAM device 401 provides the result of the comparison operation as an index signal. This index signal is used as a read address by SRAM 402. SRAM 402 provides a translated address from the location identified by the index signal. The translated address, which identifies the destination of the data stored in memory 403, is provided to microprocessor 400 (connection not shown here).

In response to the translated address, microprocessor 400 causes the corresponding data to be retrieved from data memory 403 and transmitted to the egress network identified by the translated address. The translated address is included in new header information that is transmitted to the destination egress network.

CAM device 401 advantageously performs an address translation much faster than conventional software methods. In addition, by segmenting a CAM to store 72-bit, 144-bit and 288-bit entries, the available capacity of the CAM array in CAM device 401 is used in an efficient manner.

CAM Device

Figure 5:
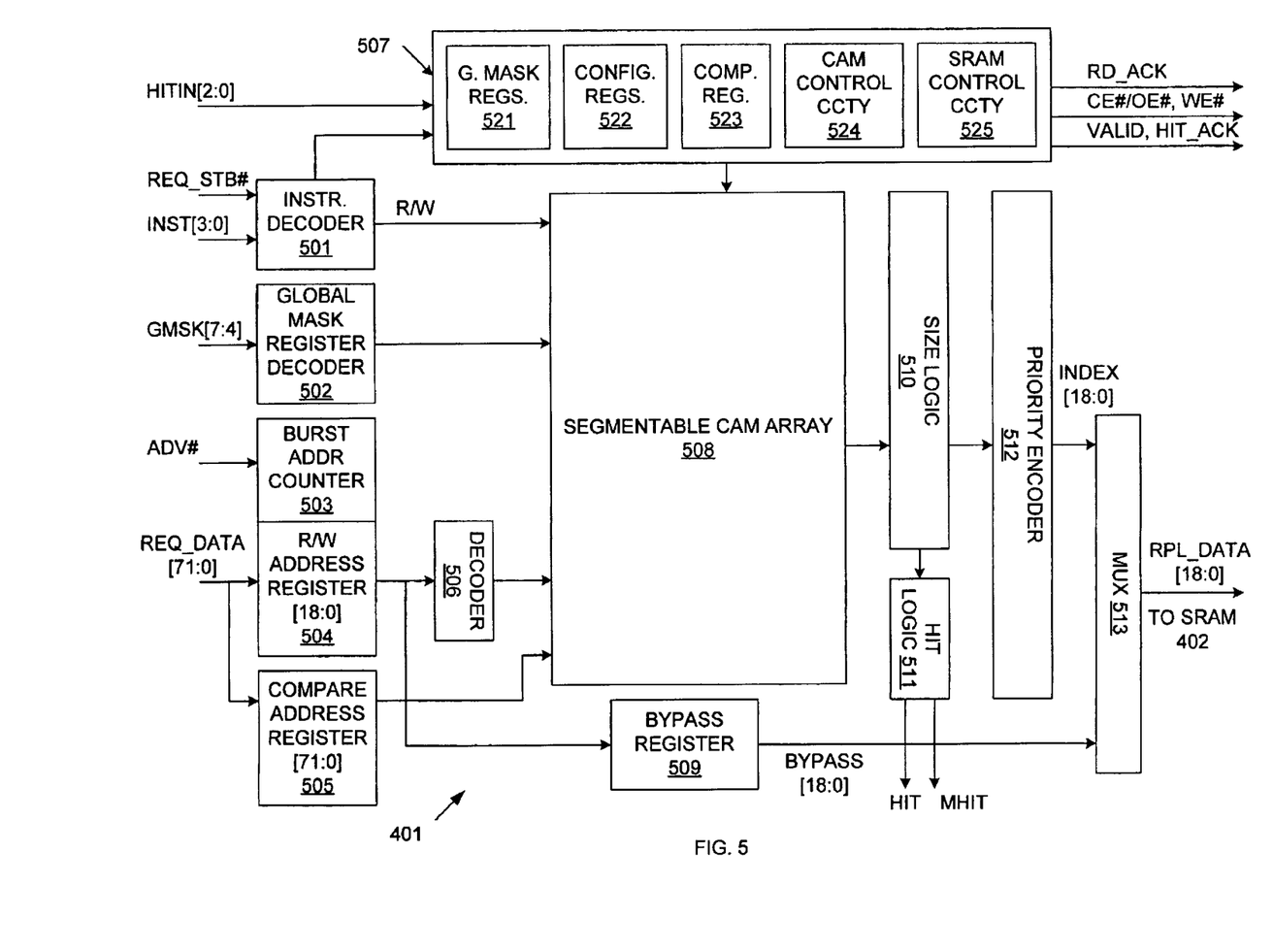
FIG. 5 is a block diagram of a CAM device present in the translation circuit of FIG. 4 in accordance with one embodiment of the present invention.

FIG. 5 is a block diagram that shows CAM device 401 in more detail in accordance with one embodiment of the present invention. CAM device 401 includes instruction decoder 501, global mask register decoder 502, burst address counter 503, read/write address latch or register 504, compare address latch or register 505, address decoder 506, control circuitry 507, segmentable CAM array 508, bypass register 509, size logic 510, hit logic 511, priority encoder 512 and output multiplexer 513. Control circuitry 507 includes global mask registers 521, configuration registers 522, comparand register 523, CAM control circuitry 524 and SRAM control circuitry 525.

CAM device 401 includes a 72-bit bi-directional bus REQ_DATA[71:0], which is a multiplexed address and data bus to minimize the number of pins. In other embodiments, separate address and data buses can be used to support different interface options. The REQ_DATA bus is coupled to read/write address register 504 and compare address register 505. The REQ_DATA bus is used for writing entries to CAM array 508 and for reading entries from CAM array 508. The REQ_DATA bus is also used to present comparison addresses to CAM array 508.

CAM device 401 also includes an independent unidirectional bus, which provides SRAM 402 (FIG. 4) with either the result of a comparison operation (i.e., INDEX[18:0]) or a signal from the REQ_DATA bus (i.e., BYPASS[18:0]). The signal provided to SRAM 402 is determined by the configuration of multiplexer 513. This unidirectional bus also includes the SRAM control signals CE#/OE# (chip enable/output enable) and WE# (write enable), which are provided by SRAM control circuitry 525 to SRAM 402.

Other signals provided by SRAM control circuitry 525 include a read acknowledge signal RD_ACK, a valid compare signal VALID, and a hit acknowledge signal HIT_ACK. The RD_ACK signal is transmitted to a pin of CAM device 401 with data being read from CAM array 508 or SRAM 402. The VALID and HIT_ACK signals are sent as early as concurrently with the INDEX signal or up to a programmable number of cycles (e.g., three cycles) after the INDEX signal is sent, as defined by a reply latency field of the configuration registers 522. The HIT_ACK signal is driven upon the successful completion of a lookup, even if the lookup did not result in a hit. The HIT_ACK signal is set to "0" for no match, and to "1" if a match was detected.

Read and write operations in CAM device 401 are always 72-bit operations. A read operation of CAM array 508, global mask registers 521 or configuration registers 522 will always result in 72-bits of data being driven onto the REQ_DATA bus. A write operation to CAM array 508, mask registers 521 or configuration registers 522 will also involve 72-bits of data being driven onto the REQ_DATA bus. Burst write operations are supported by CAM device 401. To perform a burst write operation, an initial address is loaded into read/write address register 504. The ADV# signal is then asserted low to automatically advance address counter 503 from this initial address.

As described in more detail below, an operation is initiated by CAM device 401 in response to an instruction INST[3:0], a global mask identifier GMSK[7:4], and an instruction strobe signal REQ_STB#. The instruction identifies various read, write and compare operations, and the global mask identifier selects a global mask from the set of global mask registers 521.

Other signals used by CAM device 401 include a clock signal (not shown), a multi-bit device select signal (not shown), which enables CAM device 401 to be selected from a plurality of cascaded CAM devices, and a reset signal (not shown) for resetting CAM device 401. Hit logic 511 provides a HIT signal, which identifies the presence of a match in CAM array 508 during a lookup operation, and a multi-hit signal MHIT, which identifies the presence of multiple hits in CAM array 508 during a lookup operation. The HIT signal is provided to each lower priority cascaded CAM device as a HITIN signal. An asserted HITIN signal indicates that a hit in a higher priority CAM has occurred, thereby informing the lower priority CAM not to drive the INDEX bus. The MHIT signal is sent as early as concurrently with the INDEX signal, or up to a programmable number of cycles after the INDEX signal is sent, as defined by a reply latency field of the configuration registers 522.

Figure 6:
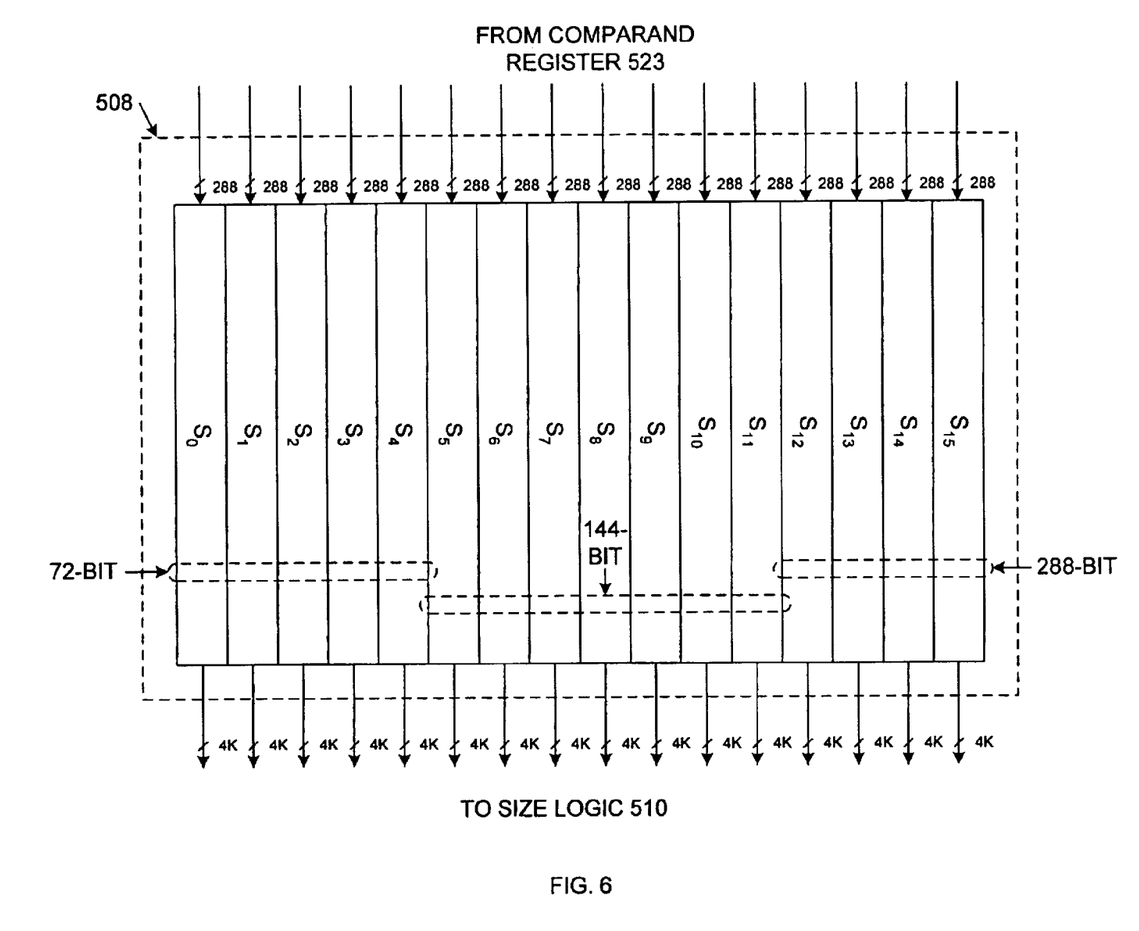
FIG. 6 is a block diagram illustrating the configuration of segmentable CAM array in accordance with one embodiment of the present invention.

FIG. 6 is a block diagram illustrating the configuration of segmentable CAM array 508 in accordance with one embodiment of the present invention. In the described embodiment, segmentable CAM array 508 is a 64k×72 (4.5 megabit (Mbit), full ternary SRAM-based CAM. Each entry in CAM array 508 has both a data bit and an associated mask bit. Thus, the total capacity of CAM array 508 is 9 M-bits of memory (i.e., 4.5 M-bits of data and 4.5 M-bits of mask entries). Segmentable CAM array 508 includes sixteen 4k×72 CAM segments $S_0$–$S_{15}$. Each of CAM segments $S_0$–$S_{15}$ has a width of 288 columns and a height of 1024 rows. As described in more detail below, each of segments $S_0$–$S_{15}$ is configured to perform 72-bit, 144-bit or 288-bit compare operations. In the described example, segments $S_0$–$S_4$ are configured to perform 72-bit compare operations, segments $S_5$–$S_{11}$ are configured to perform 144-bit compare operations, and segments $S_{12}$–$S_{15}$ are configured to perform 288-bit compare operations. Segments $S_0$–$S_{15}$ can be configured in other manners in other examples.

During a compare operation, segmentable CAM array 508 receives a comparand address from comparand register 523. The comparand address is compared with the contents of CAM array 508, and the resulting match signals are provided to size logic 510. As described in more detail below, size logic 510 is configured to route and/or combine the match signals, depending on the selected widths of the various segments.

Figure 7:
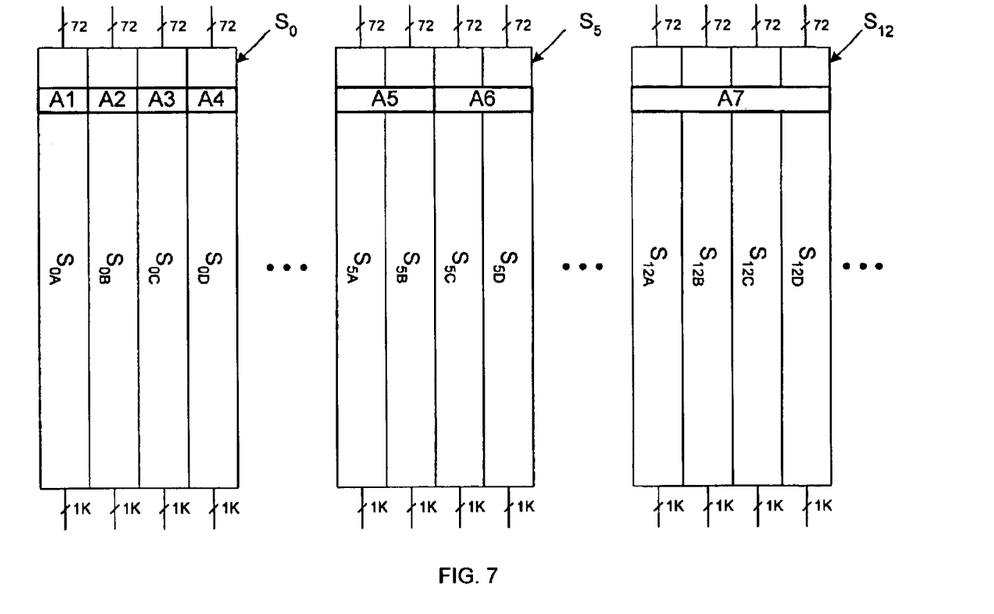
FIG. 7 is a block diagram illustrating selected segments of the CAM array of FIG. 6 in accordance with one embodiment of the present invention.

FIG. 7 is a block diagram illustrating segments $S_0$, $S_5$, and $S_{12}$ in more detail. Each of segments $S_N$ (N=0 to 15) includes four sub-segments $S_{NA}$-$S_{ND}$. Thus, segment $S_0$ includes sub-segments $S_{OA}$, $S_{OB}$, $S_{OC}$ and $S_{OD}$. Each sub-segment has a width of 72-bits and a height of 1024 bits. Note that in the present example, segment $S_0$ is configured to store 72-bit comparison addresses, such as comparison addresses A1–A4. Thus, each of sub-segments $S_{OA}$, $S_{OB}$, $S_{OC}$ and $S_{OD}$ is configured to store 1024 72-bit comparison addresses.

Also in the present example, segment $S_5$ is configured to store 144-bit comparison addresses. To accomplish this, sub-segments $S_{5A}$ and $S_{5B}$ are configured to store 1024 144-bit comparison addresses (e.g., comparison address A5), and sub-segments $S_{5C}$ and $S_{5D}$ are configured to store 1024 144-bit comparison addresses (e.g., comparison address A6).

Also in the present example, segment $S_{12}$ is configured to store 288-bit comparison addresses. To accomplish this, sub-segments $S_{12A}$, $S_{12B}$, $S_{12C}$ and $S_{12D}$ are configured to store 1024 288-bit comparison addresses, such as comparison address A7.

Figure 8:
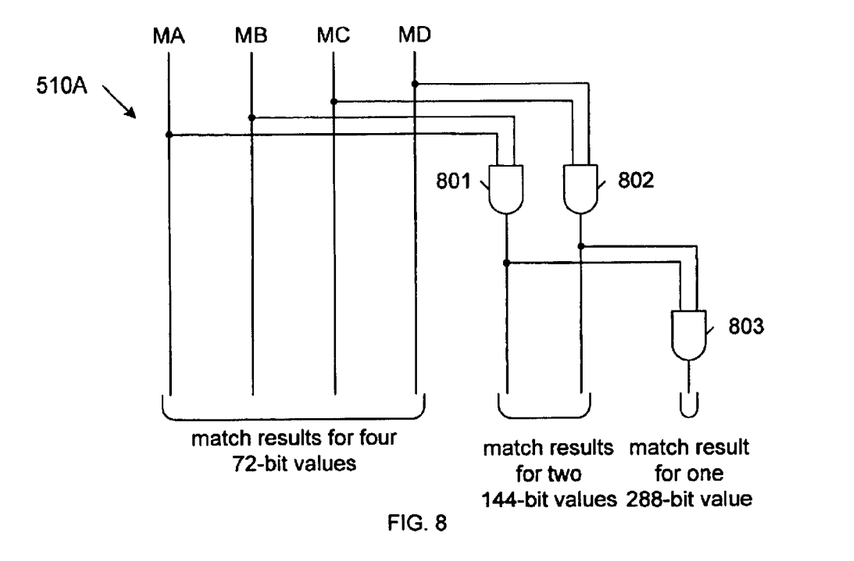
FIG. 8 is a logic diagram illustrating a portion of size logic coupled to the CAM array of FIG. 6 in accordance with one embodiment of the present invention.

FIG. 8 is a logic diagram illustrating a portion 510A of size logic 510 in accordance with one embodiment of the present invention. Size logic portion 510A is coupled to the four match lines MA–MD associated with one row of a segment in CAM array 508. For example, size logic portion 510A can be coupled to the four match lines for the row of segment $S_0$ that stores 72-bit compare addresses A1–A4. In this example, the results of each of the four match lines $M_A$–$M_D$ are routed directly through size logic portion 510A as four separate 72-bit results.

In another example, size logic portion 510A can be coupled to the four match lines MA–MD for the row of segment $S_5$ that stores 144-bit compare addresses A5–A6. In this example, the results of the two match lines $M_A$–$M_B$ corresponding with sub-sections $S_{5A}$ and $S_{5B}$ are logically ANDed by AND gate 801, thereby providing a first 144-bit match result. Similarly, the results of the two match lines $M_{C-MD}$ corresponding with sub-sections $S_{5C}$ and $S_{5D}$ are logically ANDed by AND gate 802, thereby providing a second 144-bit match result.

In another example, size logic portion 510A can be coupled to the four match lines $M_A$–$M_D$ for the row of segment $S_{12}$ that stores 288-bit compare address A7. In this example, the results of the four match lines corresponding with sub-sections $S_{12A}$, $S_{12B}$, $S_{12C}$ and $S_{12D}$ are logically ANDed by AND gates 801–803, thereby providing a 288-bit match result.

CAM array 508 is initially loaded with comparison address values, and SRAM 402 is initially loaded with translated addresses in view of the characteristics of networks 301–306. That is, CAM array 508 and SRAM 402 are loaded with the values required to translate the addresses received from ingress networks 301–303 and provide the appropriate output addresses to egress networks 304–306. The particular values loaded into CAM array 508 and SRAM 402 are dependent on the various network types and will be understood by those skilled in the art. The manner of writing values to CAM array 508 and SRAM 402 is described in more detail below.

REGISTERS

Figure 9:
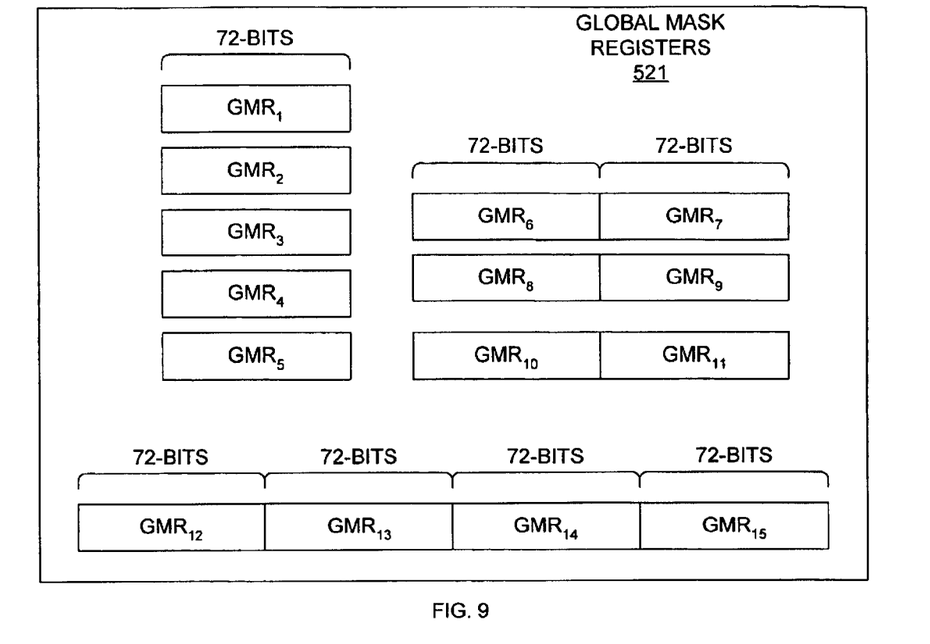
FIGS. 9 and 10 are block diagrams illustrating a global mask register set and a configuration register set, respectively, in accordance with one embodiment of the present invention.
Figure 10:
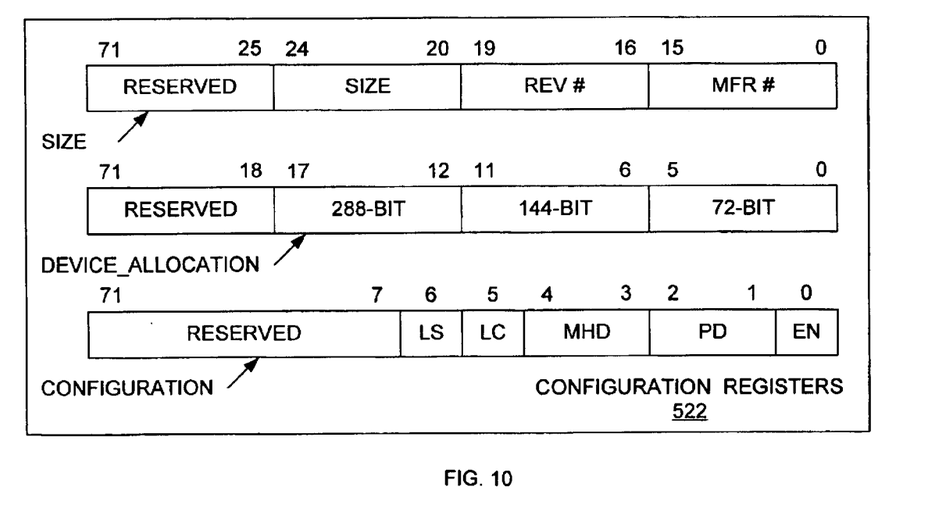

FIGS. 9 and 10 are block diagrams illustrating global mask register set 521 and configuration register set 522, respectively. In the described embodiment, there are fifteen global mask registers $GMR_1$–$GMR_{15}$ included in global mask register set 521, and multiple configuration registers, SIZE, DEVICE_ALLOCATION and CONFIGURATION included in configuration register set 522. These registers are addressed by signals provided on the five least significant bits of the REQ_DATA bus (i.e., REQ_DATA[4:0]).

Each of the fifteen global mask registers $GMR_1$–$GMR_{15}$ can be used to mask one or more bits of a 72-bit value during a write operation or a compare operation. Bits that are masked by the selected global mask register will not alter the corresponding bits stored in CAM array 508 during a write operation. Similarly, bits that are masked by the selected global mask register will not cause a no-match condition to exist during a compare operation. The global mask registers can be used to mask write operations to either data bits or mask bits in CAM array 508.

In the described embodiment, five global mask registers $GMR_1$–$GMR_5$ are used for 72-bit compare and write operations, six global mask registers $GMR_6$–$GMR_{11}$, are used for 144-bit compare and write operations, and four global mask registers $GMR_{12}$–$GMR_{15}$ are used for 288-bit compare and write operations.

The SIZE register is a 72-bit register that stores bits SIZE[17:0]. The SIZE[15:0] bits store the manufacture number (MFR#) as assigned by the Joint Electron Device Engineering Council (JEDEC). The SIZE[19:161] bits store the revision number of the part, which starts with "0000" and is incremented for each revision of CAM device 401. The SIZE[24:20] bits store the binary equivalent of the size of the CAM array 508 in M-bits. In the described embodiment, the 4.5 M-bit CAM is represented by "00100" (binary 4). The SIZE[71:25] bits are reserved for future use.

The DEVICE_ALLOCATION register is a 72-bit register that stores bits DA[71:0]. The DA[5:0] bits identify the segments in CAM 508 that are configured to store 72-bit values. The DA[11:6] bits identify the segments in CAM 508 that are configured to store 144-bit values. The DA[17:12] bits identify the segments in CAM 508 that are configured to store 288-bit values. The DA[71:18] bits are reserved for future use.

In the described embodiment, the 72-bit segments are allocated first, followed by the 144-bit segments and the 288-bit segments. Thus, in the present example, the DA[5:0] bits have a value of "000101" (binary 5), thereby allocating the first five segments ($S_0$–$S_4$) of CAM array 508 for storing 72-bit compare addresses. Also in the present example, the DA[11:6] bits have a value of "001100" (binary 12), thereby allocating the sixth through twelfth segments ($S_5$–$S_{11}$) of CAM array 508 for storing 144-bit compare addresses. Finally, the DA[17:12] bits have a value of "010000" (binary 16), thereby allocating the thirteenth through sixteenth segments ($S_{12}$–$S_{15}$) of CAM array 508 for storing 288-bit compare addresses.

The CONFIGURATION register is a 72-bit register that stores bits CR[17:0]. The CR[0] bit is the CAM enable bit. This bit is cleared to a "0" when a global reset signal is pulled-low. The logic "0" CAM enable-bit will tri-state the INDEX, CE#/OE#, VALID, HIT_ACK and RD_ACK signals until this bit is enabled (i.e., a "1" is written to CR[0]).

The CR[2:1] bits are pipeline delay bits that enable the user to set the pipeline delay for the VALID and HIT_ACK signals. These bits define the number of clock cycles (0–3) that the VALID and HIT_ACK signals will be delayed with respect to the INDEX signal. This allows the user to receive the VALID and HIT_ACK signals with the INDEX signals or with the values read from SRAM 402.

The CR[4:3] bits are pipeline delay bits that enable the user to set the pipeline delay for the multiple hit (MHIT) signal. These bits define the number of clock cycles (0–3) that the MHIT signal will be delayed with respect to the INDEX signals. This allows the user to receive the MHIT signal with the INDEX signals or up to three cycles later.

The CR[5] bit is set in the last device in a string of cascaded CAM devices. Only the last device drives the RD_ACT, VALID and HIT_ACK signals.

The CR[6] bit is set in the last device in a string of cascaded CAM devices that are coupled to a common SRAM 402. Only this last device drives the CE#/OE# and WE# signals to the associated SRAM 402. This device will also default to driving the Index bus when no operation is ongoing, thereby preventing the Index bus from floating.

WRITE OPERATIONS

Write operations involving CAM device 401 or SRAM 402 are performed as follows. A 4-bit instruction INST[3:0] is provided to instruction decoder 501. Table 1 defines the instructions used for write operations in accordance with the described embodiment.

TABLE 1

| INST[3:0] | Instruction | Description |
| --- | --- | --- |
| 0000 | Write Register | Write to configuration registers 522 or global mask registers 521 identified by REQ_DATA[4:0] |
| 0010 | Write Data | Write data to CAM array 508 at the address identified by REQ_DATA[15:0] |
| 0100 | Write Mask | Write mask info to CAM array 508 at the address identified by REQ_DATA[15:0] |
| 0110 | Write SRAM | Write data to SRAM 402 at the address identified by REQ_DATA[15:0] |

Figure 11:
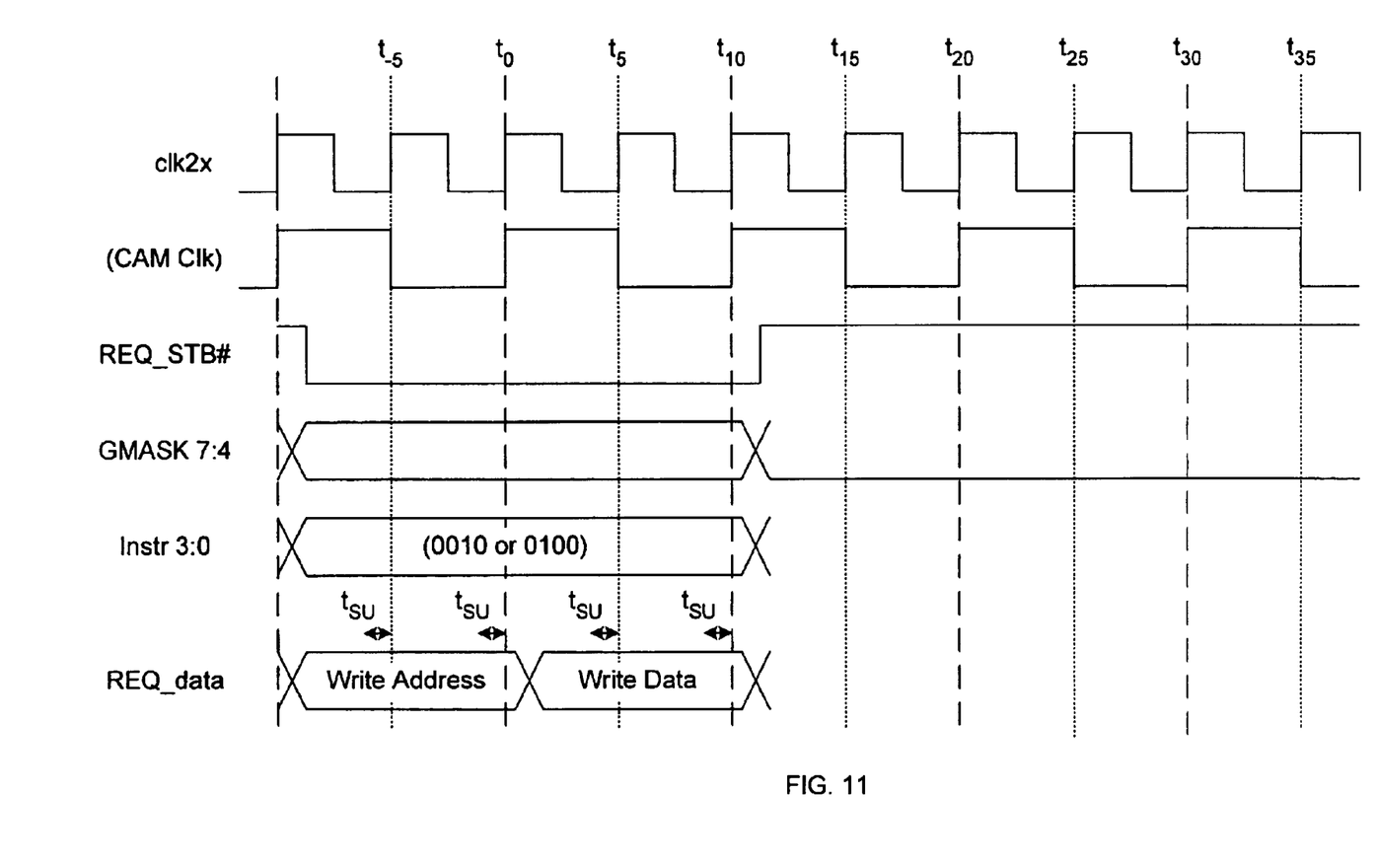
FIG. 11 is a waveform diagram illustrating a Write Data or Write Mask operation in accordance with one embodiment of the present invention.

Thus, to perform a write operation to CAM array 508, the appropriate write instruction (Write Data or Write Mask) is applied to instruction decoder 501, the desired address is provided on the REQ_DATA bus, and the REQ_STB# signal is strobed. Subsequently, the write information is loaded into register 505. FIG. 11 is a waveform diagram illustrating a Write Data or Write Mask operation.

To write to a global mask or configuration register, the Write Register instruction is applied to instruction decoder 501, the address corresponding to the register to be written is provided on the five least significant bits of the REQ_DATA bus, and the REQ_STB# signal is strobed. Subsequently, the register information is loaded into data register DATA[17:0] and transferred to the addressed register.

Data is written to SRAM 402 in a similar manner. However, the write address is routed to SRAM 402 through bypass circuit 509 and multiplexer 513. In response to the Write SRAM instruction, RAM control circuitry 507 provides the CE#/OE# and WE# signals to implement a write operation in SRAM 402. The data values to be written to SRAM 402 are provided on a separate bus (not shown).

After CAM array 508, SRAM 402, global mask registers 521 and configuration registers 522 have been loaded, then address translations can be performed.

READ OPERATIONS

Read operations involving CAM device 401 and SRAM 402 are performed as follows. A 4-bit instruction INST[3:0] is provided to instruction decoder 501. Table 2 defines the instructions used for read operations in accordance with the described embodiment.

TABLE 2

| INST[3:0] | Instruction | Description |
| --- | --- | --- |
| 0001 | Read Register | Read from the configuration register 522 or global mask register 521 identified by REQ_DATA[4:0] |
| 0011 | Read Data | Read data from CAM array 508 at the address identified by REQ_DATA[15:0] |
| 0101 | Read Mask | Read mask info from CAM array 508 at the address identified by REQ_DATA[15:0] |
| 0111 | Read SRAM | Read data from SRAM 402 at the address identified by REQ_DATA[15:0] |

Figure 12:
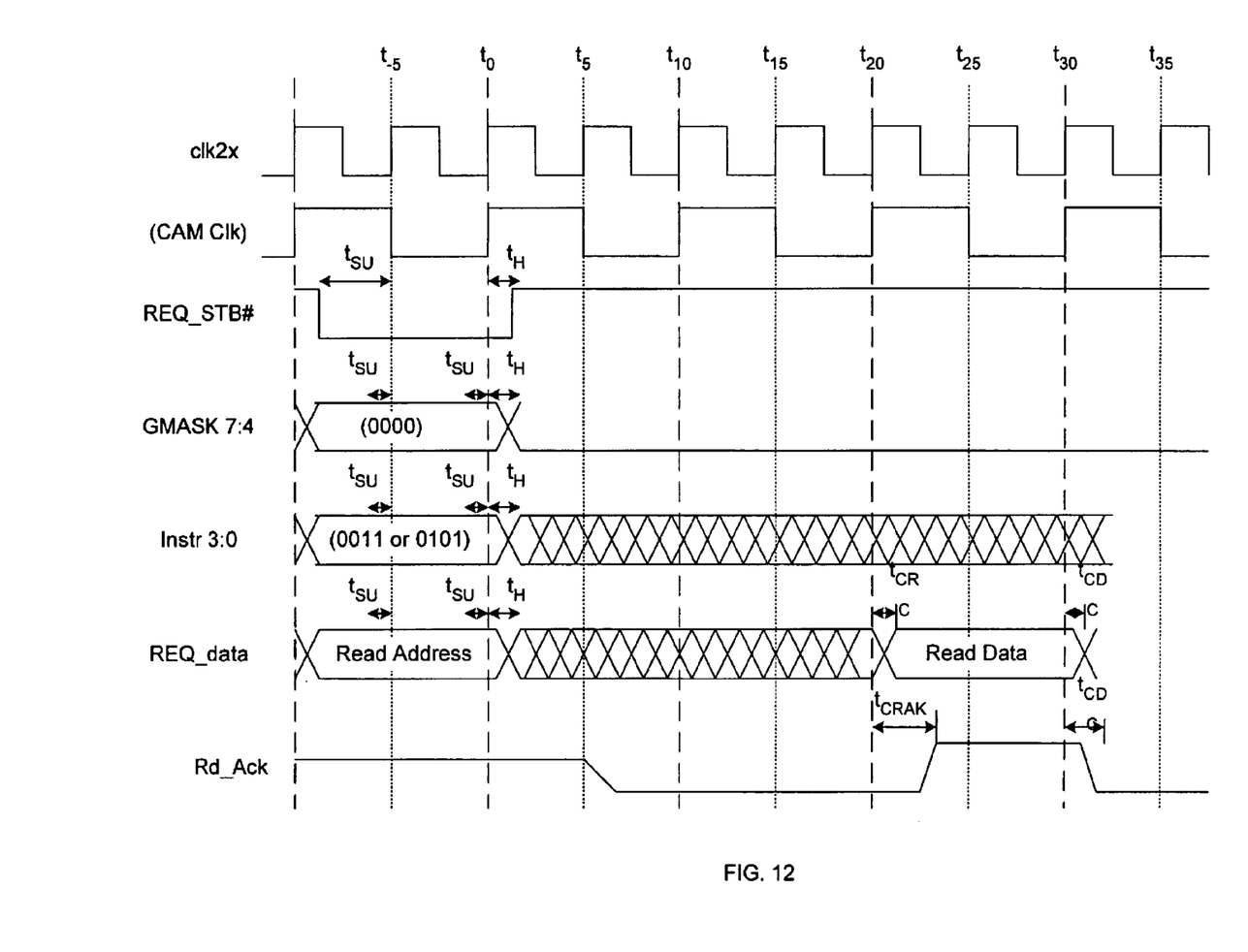
FIG. 12 is a waveform diagram illustrating a Read Data or Read Mask operation in accordance with one embodiment of the present invention.

Thus, to perform a read operation of CAM array 508, the appropriate read instruction (Read Data or Read Mask) is applied to instruction decoder 501, the desired address is provided on the REQ_DATA bus, and the REQ_STB# signal is asserted. In response, the read data is loaded into data register DATA[71:01 ] and provided on the REQ_DATA bus. FIG. 12 is a waveform diagram illustrating a Read Data or Read Mask operation.

To read from a global mask register or a configuration register, the Read Register instruction is applied to instruction decoder 501, the address corresponding to the register to be read is provided on the five least significant bits of the REQ_DATA bus, and the REQ_STB# signal is asserted. In response, the register information is read from the addressed register, and is provided on the REQ_DATA bus.

Data is read from SRAM 402 in a similar manner. However, the read address is routed to SRAM 402 through bypass circuit 509 and multiplexer 513. In response to the Read SRAM instruction, RAM control circuitry 507 provides the CE#/OE# and WE# signals to implement a read operation in SRAM 402. The data values read from SRAM 402 are provided on a separate bus (not shown).

ADDRESS TRANSLATIONS

Conventional CAM devices have allowed the width of a lookup to be selected, with the limitation that the entire CAM device must be configured to have the same lookup width (e.g., the entire CAM device is configured to have a lookup width of 144-bits). In contrast, CAM device 401 can be configured to perform lookup or comparison operations on data structures having widths of 72-bits, 144-bits and 288-bits. This enables the resources of CAM device 401 to be used more efficiently. To enable CAM device 401 to perform multiple width lookups, each of the segments $S_0$–$S_{15}$ of CAM array 602 can be configured to perform 72-bit, 144-bit or 288-bit compare operations. Thus, in the present example, segments $S_0$–$S_4$ are configured to perform 72-bit compare operations, segments $S_5$–$S_{11}$ are configured to perform 144-bit compare operations, and segments $S_{12}$–$S_{15}$ are configured to perform 288-bit compare operations. Many other configurations are possible. In the described embodiment, all compare operations of the same width must be performed within consecutive segments in CAM array 508. Although all compare operations having a constant width must be performed within consecutive segments in the present embodiment, this is a matter of convenience in the present embodiment, and is not considered a requirement of the present invention. Different decoding structures can be provided in other embodiments to enable non-consecutive segments to perform compare operations of the same width.

In the described example, it is assumed that network 301 requires a 72-bit lookup, network 302 requires a 144-bit lookup, and network 303 requires a 288-bit lookup. Thus, segments $S_0$–$S_4$ are used to perform the 72-bit lookups required by network 301, segments $S_5$–$S_{11}$ are used to perform the 144-bit lookups required by network 302, and segments $S_{12}$–$S_{15}$ are used to perform the 288-bit lookups required by network 303. It is possible for multiple ingress networks to require lookups of the same width. For example, ingress networks 301 and 302 may both require a 72-bit lookup. In this case, these ingress networks can share the same segments in CAM array 508, either with or without global masking.

A compare (lookup) operation is performed in CAM device 401 as follows. A 4-bit instruction INST[3:0] is provided to instruction decoder 501. Table 3 defines the instructions used for compare (lookup) operations in accordance with the described embodiment.

TABLE 3

| INST[3:0] | Instruction | Description |
|---|---|---|
| 1000 | 72-bit Lookup | Intiate a 72-bit lookup in all areas defined as 72-bit data in the configuration registers. If a GMR is defined, the data will be ANDed with the global mask register (GMR) data to present data to the array for comparison. |
| 1001 | 144-bit Lookup | Intiate a 144-bit lookup in all areas defined as 144-bit data in the configuration registers. If a GMR is defined, the data will be ANDed with the GMR data to present data to the array for comparison. |
| 1010 | 288-bit Lookup | Intiate a 288-bit lookup in all areas defined as 288-bit data in the configuration registers. If a GMR is defined, the data will be ANDed with the GMR data to present data to the array for comparison. |

A 4-bit global mask register address GMR[7:4] is also provided to global mask register decoder 502. Table 4 defines the global mask register assignments in accordance with the described embodiment.

TABLE 4

| GMASK[7:4] | LOOKUP TYPE | ASSOCIATED MASK REGISTER |
|---|---|---|
| 0000 | ANY | No Masking |
| 0001 | 72-bit | 1 |
| 0010 | 72-bit | 2 |
| 0011 | 72-bit | 3 |
| 0100 | 72-bit | 4 |
| 0101 | 72-bit | 5 |
| 0110 | 144-bit | 6, 7 |
| 0111 | 144-bit | |
| 1000 | 144-bit | 8, 9 |
| 1001 | 144-bit | |
| 1010 | 144-bit | 10, 11 |
| 1011 | 144-bit | |
| 1100 | 288-bit | 12, 13, 14, 15 |
| 1101 | 288-bit | |
| 1110 | 288-bit | |
| 1111 | 288-bit | |

TABLE 4-continued

Thus, to perform a 72-bit lookup with global mask register 1, an instruction INST[3:0] of "1000" is applied to instruction decoder 501, a global mask address GMR[7:4] of "0001" is applied to GMR decoder 502, the desired comparison data value is provided on the REQ_DATA bus, and the REQ_STB# signal is strobed. In response, instruction decoder 501 determines that a 72-bit lookup is being performed.

The DEVICE_ALLOCATION register indicates that only segments $S_0$–$S_4$ of CAM array 508 are designated for 72-bit compare operations. As a result, CAM control circuitry 524 does not apply comparison address values to segments $S_5$–$S_{51}$ of CAM array 508. This advantageously reduces the power consumption of the resulting compare operation. Global mask decoder 502 causes $GMR_1$ to be accessed in response to the global mask address of "0001". The 72-bit input comparison address is logically ANDed with the contents of 72-bit global mask register $GMR_1$, and the result is stored in comparand register 523. The value stored in comparand register 523 is applied to each 72-bit sub-segment in segments $S_0$–$S_4$.

The results of the compare operation (i.e., the match signals) are provided to size logic 510. As described above, size logic 510 is configured to pass four match signals for every row in each of segments $S_n$–$S_4$. These match signals are routed to priority encoder 512 (FIG. 3), which identifies the match signal having the highest priority (e.g., the match signal having the lowest address in CAM array 508). Priority encoder 512 provides an INDEX signal that corresponds with this identified match signal.

To perform a 144-bit lookup with global mask registers $GMR_6$–$GMR_7$, an instruction INST[3:0] of "1001" is applied to instruction decoder 501, a global mask address GMR[7:4 ] of "0110" is applied to GMR decoder 502, the first 72-bits of the desired comparison address value are provided on the REQ_DATA bus, and the REQ_STB# signal is asserted. In response, instruction decoder 501 determines that a 144-bit lookup is being performed.

The DEVICE_ALLOCATION register indicates that only segments $S_5$–$S_{11}$ of CAM array 508 are designated for 144-bit compare operations. As a result, CAM control circuitry 524 does not apply comparison address values to segments $S_0$–$S_4$ and $S_{12}$–$S_{15}$ of CAM array 508. Again, this advantageously reduces the power consumption of the resulting compare operation. Global mask decoder 502 causes global mask registers $GMR_6$–$GMR_7$ to be accessed in response to the global mask address of "0110". The first 72-bits of the input comparison address are logically ANDed with the contents of 72-bit global mask register $GMR_6$, and the result is stored in comparand register 523.

The second 72-bits of the input comparison address are then provided on the REQ_DATA bus. The second 72-bits of the comparison address are logically ANDed with the contents of 72-bit global mask register $GMR_7$, and the result is stored in comparand register 523. At this time, the entire 144-bit comparison address is stored in comparand register 523.

The 144-bit comparison address stored in comparand register 523 is applied to the "A" and "B" sub-segments of segments $S_5$–$S_{11}$, and to the "C" and "D" sub-segments of segments $S_5$–$S_{11}$. For example, this 144-bit comparison address is applied to sub-segments $S_{5A}$–$S_{5B}$ and to sub-segments $S_{5C}$–$S_{5D}$ (FIG. 7).

Figure 13:
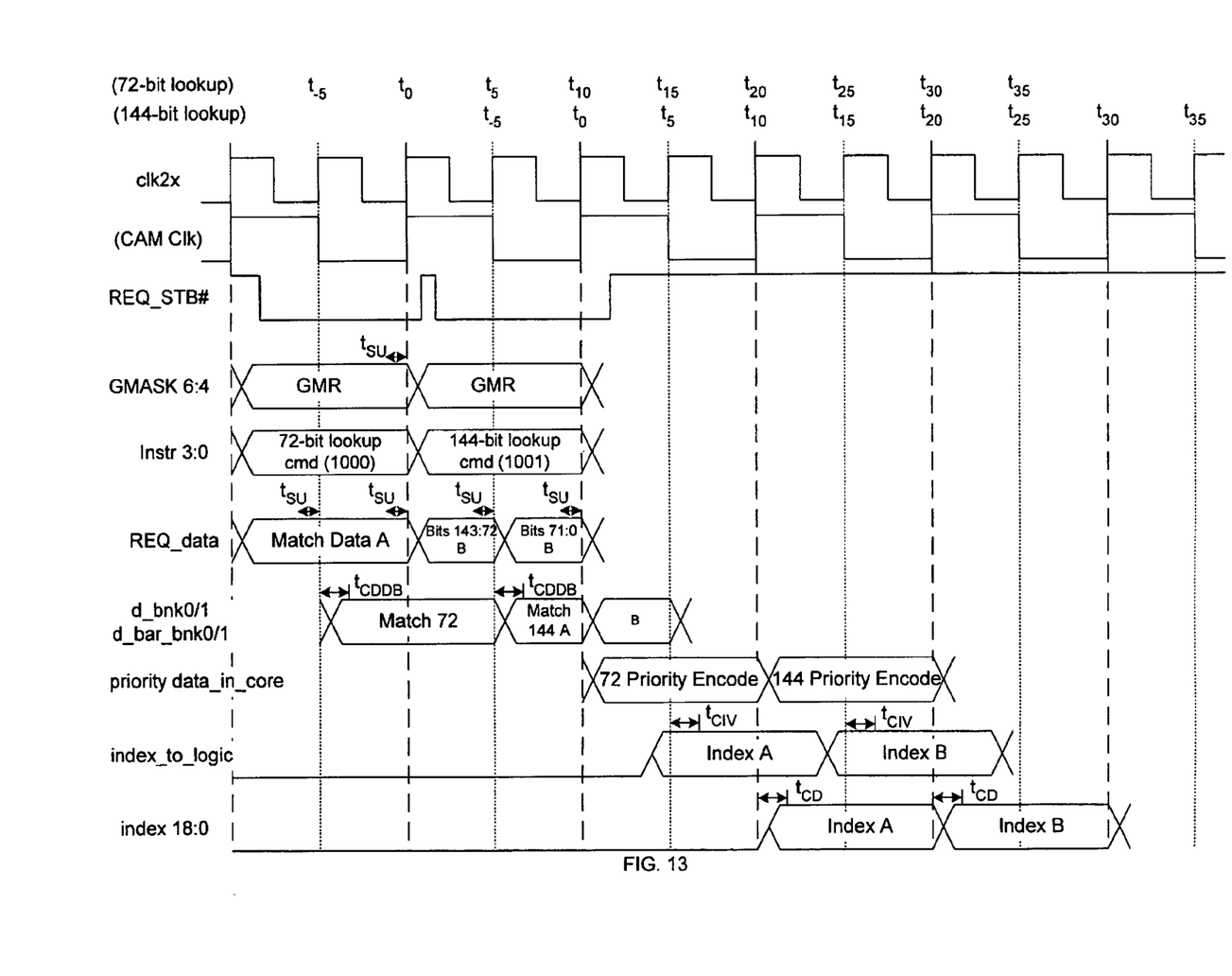
FIG. 13 is a waveform diagram illustrating a 72-bit compare operation followed by a 144-bit compare operation in accordance with one embodiment of the present invention.

The results of the compare operation (i.e., the match signals) are provided to size logic 510. As described above, size logic 510 is configured to pass two match signals for every row in each of segments $S_5$–$S_{11}$. These match signals are routed to priority encoder 512, which identifies the match signal having the highest priority (e.g., the match signal having the lowest address in CAM array 508). Priority encoder 512 provides an INDEX signal that corresponds with this identified match signal. FIG. 13 is a waveform diagram illustrating a 72-bit compare operation followed by a 144-bit compare operation.

Figure 14:
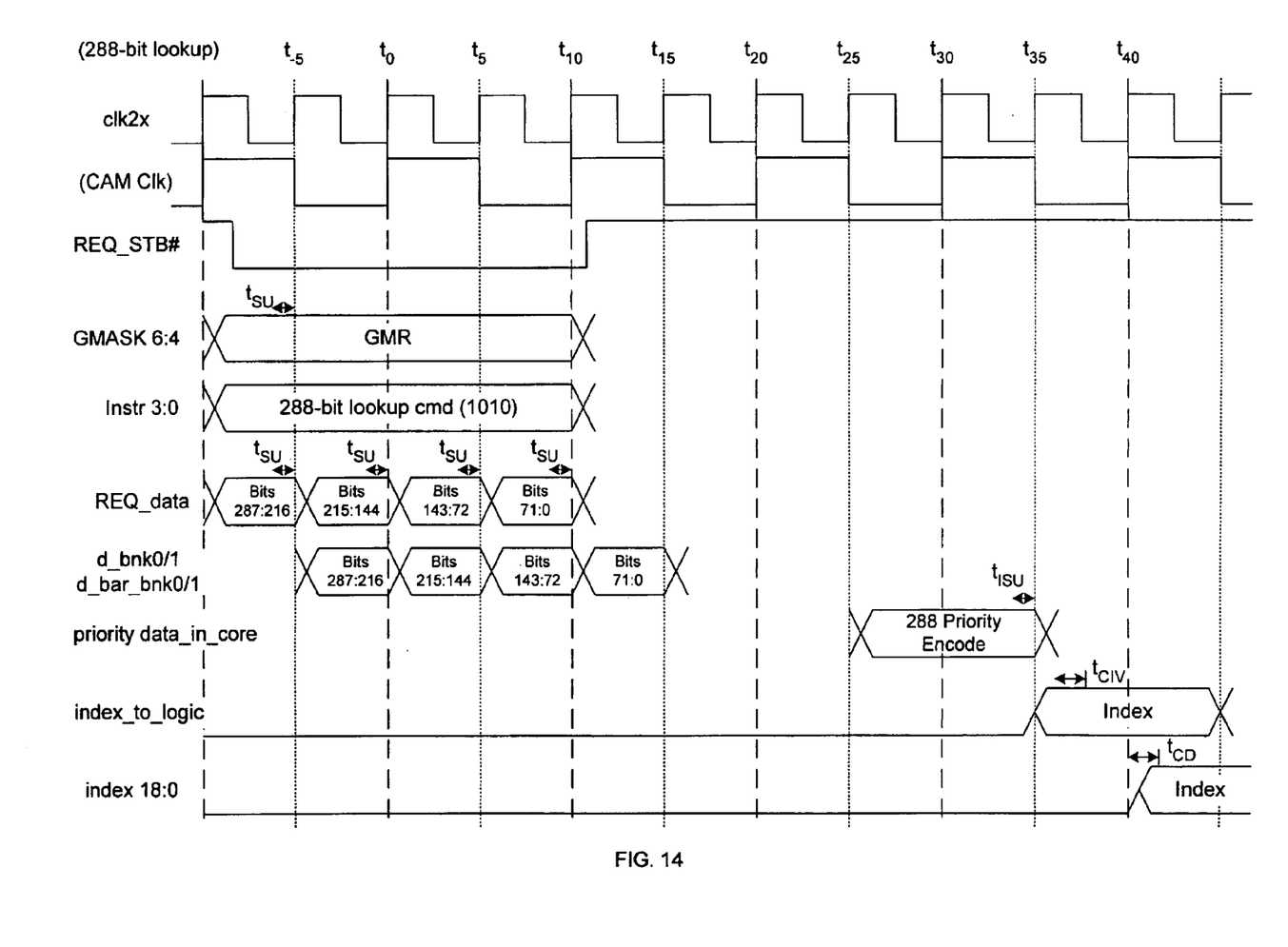
FIG. 14 is a waveform diagram illustrating a 288-bit compare operation in accordance with one embodiment of the present invention.

A 288-bit lookup is performed in a manner similar to the 72-bit and 144-bit lookups. FIG. 14 is a waveform diagram illustrating a 288-bit compare operation.

Multiplexer 513 is controlled to route the INDEX[18:0] signal to SRAM 402 as an address signal. The INDEX[18:0] signal provided to SRAM 402 includes a 17-bit signal (i.e., INDEX[16:0]) identifying the highest priority match detected in CAM array 508, plus an upper set of at least two bits (i.e., INDEX[18:17]) that are programmed at power up to signify the relative priority of CAM array 508 if multiple CAM devices (up to four) are cascaded. When a lookup operation has a width greater than 72-bits, the least significant bits of the 17-bit Index signal will always be driven to a logic "0" value. For example, on a 144-bit lookup, the resulting Index signal will always have a logic "0" value for the least significant bit (i.e., INDEX[0]), and on a 288-bit lookup, the resulting Index signal will always have logic "0" values for the-two least significant bits (i.e., INDEX[1:0]).

In response to the INDEX[18:0] signal (and the various control signals provided by SRAM control circuitry 525), SRAM 402 is accessed at the address identified by the INDEX[18:0] signal. The value read from SRAM 402 is the translated address.

In another embodiment of the present invention, CAM array 508 is configured to provide two identical segments corresponding with one ingress network to enable quality of service monitoring. In the above example, segments $S_5$–$S_9$ can be configured in the same manner as segments $S_0$–$S4$. The same comparison addresses are applied to segments $S_0$–$S_4$ and segments $S_5$–$S_9$. An Index signal will only be generated if a match is detected at the same locations in segments $S_0$–$S_4$ and segments $S_5$–$S9$. As a result, the quality of service is improved.

In another embodiment, translation circuit 310 can provide accounting and policing options. For example, CAM device 401 can maintain a count of the total number of hits on all networks (accounting). CAM device 410 can further be monitored to determine if there is a match detected in a specified segment of CAM array 508. If a match is detected in the specified segment, then the translated address is not transmitted to the egress network (policing).

Although the present invention has been described in connection with several embodiments, it is understood that this invention is not limited to the embodiments disclosed, but is capable of various modifications which would be apparent to one of ordinary skill in the art. For example, the described translation circuit can be configured to handle more or less than three ingress networks and three egress networks. In addition, the CAM array can be configured to handle more (or less) than three address comparison widths. Furthermore, although the described embodiments described sub-segments having the same widths, it is possible for the sub-segments to have different widths. Thus, the invention is limited only by the following claims.

I claim:

1. A translation circuit for translating addresses between computer networks, the translation circuit comprising:
    a content addressable memory (CAM) device having a CAM array that is logically divided into a plurality of CAM segments, each of the CAM segments having a fixed width, wherein each of the CAM segments extends a full height of the CAM array;
    a device allocation register including a first entry and a second entry, wherein the first entry is programmable to define a first set of CAM segments for performing comparison operations of a first width, less than the fixed width, and wherein the second entry is programmable to define a second set of CAM segments for performing comparison operations of a second width, wherein the second width is greater than the first width and less than or equal to the fixed width.

2. The translation circuit of claim 1, wherein each of the CAM segments has the same width.

3. The translation circuit of claim 1, wherein the device allocation register further includes a third entry, wherein the third entry is programmable to define a third set of CAM segments for performing comparison operations of a third width, less than the second width and greater than the first width.

4. The translation circuit of claim 1, wherein the CAM device further comprises an instruction decoder configured to receive instructions that specify comparison operations of the first width or the second width.

5. The translation circuit of claim 1, wherein the CAM device further comprises a plurality or global mask registers for masking values provided to the CAM array.

6. The translation circuit of claim 1, wherein the CAM device further comprises:
    an address register configured to receive an initial address, wherein the address register defines a write address in the CAM device; and
    means for automatically advancing the address register from the initial address, thereby enabling burst write operations to the CAM array.

7. The translation circuit of claim 1, wherein each of the CAM segments includes a plurality of sub-segments, each having the first width.

8. The translation circuit of claim 7, wherein a combined plurality of the sub-segments have the second width.

9. The translation circuit of claim 7, wherein each of the sub-segments is configured to store comparison values.

10. The translation circuit of claim 1, wherein the second width is a multiple of the first width.

11. The translation circuit of claim 10, wherein the second width is two times the first width.

12. The translation circuit of claim 10, wherein the second width is four times the first width.

13. The translation circuit of claim 1, wherein the CAM device further comprises size logic coupled to the CAM array, wherein the size logic processes results from the first and second sets of segments in a manner consistent with the widths of the comparison operations performed by these segments.

14. The translation circuit of claim 13, wherein the CAM device further comprises a priority encoder coupled to the size logic.

15. The translation circuit of claim 1, further comprising a static random access memory (SRAM) coupled to the CAM device, wherein a result of a compare operation in the CAM device is used to address the SRAM.

16. The translation circuit of claim 15, wherein the CAM device further comprises a bypass circuit for routing an address directly to the SRAM, bypassing the CAM array.

17. A method of performing address translations for a computer system using a content addressable memory (CAM) array, the method comprising the steps of:

defining a first comparison width in a first set of one or mote segments of the CAM array, wherein each of the segments in the first set has a fixed width and extends a full height of the CAM array;

defining a second comparison width in a second set of one or more segments of the CAM array, wherein each of the segments in the second set has the fixed width and extends a full height of the CAM array;

receiving an instruction that specifies an address translation of the first comparison width or the second comparison width;

performing a comparison operation only in the first set of segments if the instruction specifies an address translation of the first comparison width; and performing a comparison operation only in the second set of segments if the instruction specifies an address translation of the second comparison width.

18. The method of claim 17, further comprising the steps of:

defining a third comparison width in a third set of segments of the CAN array, wherein the instruction can specify an address translation of the third width; and performing a comparison operation only in the third set of segments if the instruction specifies an address translation of the third width.

19. The method of claim 17, further comprising the steps of:

providing a result of a comparison operation to a random access memory (RAM) as an index value; and providing a translated address from the RAM in response to the index value.

20. The method of claim 17, further comprising the steps of:

defining a global mask for use during a comparison operation; and applying the global mask during a comparison operation.

21. The method of claim 17, further comprising the steps of:

selecting the number of segments in the first set of segments; and selecting the number of segments in the second set of segments.

22. The method of claim 17, wherein each of the segments in the first and second sets comprises a plurality of sub-segments, each having the same width, the method further comprising the step of:

storing a first set of comparison values in the first set of segments, each of the comparison values in the first set of comparison values having a width corresponding with the width of a single sub-segment; and storing a second set of comparison values in the second set of segments, each of the comparison values in the second set of comparison values having a width corresponding with the width of multiple sub-segments.

23. The method of claim 22, wherein the comparison values in the second set of comparison values have a width corresponding with the width of one of the segments in the second set of segments.

* * * * *